(12) United States Patent
Liu et al.

(10) Patent No.: US 8,849,053 B2
(45) Date of Patent: Sep. 30, 2014

(54) PARAMETRIC LOOP FILTER

(75) Inventors: Wei Liu, San Jose, CA (US); Ehsan Maani, San Jose, CA (US); Lina Dong, San Jose, CA (US)

(73) Assignee: Sony Corporation, Tokyo (JP)

( * ) Notice: Subject to any disclaimer, the term of this patent is extended or adjusted under 35 U.S.C. 154(b) by 765 days.

(21) Appl. No.: 13/038,182

(22) Filed: Mar. 1, 2011

(65) Prior Publication Data

US 2012/0183050 A1 Jul. 19, 2012

Related U.S. Application Data

(60) Provisional application No. 61/433,026, filed on Jan. 14, 2011.

(51) Int. Cl.
*G06K 9/40* (2006.01)
*H04N 19/86* (2014.01)
*H04N 19/117* (2014.01)
*H04N 19/102* (2014.01)
*H04N 19/136* (2014.01)
*H04N 19/82* (2014.01)
*H04N 19/463* (2014.01)

(52) U.S. Cl.
CPC ....... *H04N 7/26888* (2013.01); *H04N 7/26058* (2013.01); *H04N 7/26074* (2013.01); *H04N 7/26127* (2013.01); *H04N 7/26382* (2013.01); *H04N 19/00551* (2013.01)
USPC .............. 382/260; 375/240.01; 382/211

(58) Field of Classification Search
USPC .............. 375/240.01, 240.02, 240.03, 240.16; 382/260, 264
See application file for complete search history.

(56) References Cited

U.S. PATENT DOCUMENTS

| | | | |
|---|---|---|---|
| 7,304,546 B2* | 12/2007 | Menkhoff | 331/17 |
| 7,430,336 B2 | 9/2008 | Raveendran | |
| 8,094,711 B2* | 1/2012 | Tourapis et al. | 375/240.01 |
| 8,548,041 B2* | 10/2013 | Fu et al. | 375/240.02 |
| 2005/0053288 A1 | 3/2005 | Srinivasan et al. | |
| 2005/0201633 A1 | 9/2005 | Moon et al. | |
| 2006/0140322 A1* | 6/2006 | Johnson et al. | 375/376 |
| 2007/0268828 A1* | 11/2007 | Peng | 370/235 |
| 2008/0056366 A1* | 3/2008 | Bhaskaran | 375/240.16 |
| 2008/0112632 A1 | 5/2008 | Vos et al. | |
| 2009/0108891 A1* | 4/2009 | Sander et al. | 327/156 |
| 2009/0257664 A1 | 10/2009 | Kao et al. | |
| 2010/0008417 A1* | 1/2010 | Xu et al. | 375/240.02 |
| 2010/0278267 A1 | 11/2010 | Lai et al. | |
| 2010/0286990 A1 | 11/2010 | Biswas et al. | |
| 2011/0096236 A1* | 4/2011 | Ngan et al. | 348/607 |
| 2011/0116546 A1* | 5/2011 | Guo et al. | 375/240.16 |
| 2012/0039383 A1* | 2/2012 | Huang et al. | 375/240.02 |
| 2012/0183050 A1* | 7/2012 | Liu et al. | 375/240.03 |

* cited by examiner

*Primary Examiner* — Gregory M Desire
(74) *Attorney, Agent, or Firm* — Haverstock & Owens LLP

(57) ABSTRACT

A parametric loop filter uses a set of fixed filters to remove or reduce noise and artifacts introduced during video coding. The filters are pre-trained offline and hardwired into encoder and decoder, instead of online trained Wiener filters. The filters are able to be specified using one or more parameters including: direction, bandwidth along the direction ($bw_{//}$) and bandwidth perpendicular to the direction ($bw_\perp$). The filter to be used is able to be derived from local image characteristics or predicted from neighboring blocks. The parametric loop filter utilizes much less computation, delay and memory access at the encoder. Fixed coefficients allow fast implementation of filtering at the decoder. A parametric loop filter is able to be combined with online training to further improve performance, by allowing one or more fixed filters to be replaced with online trained Wiener filters.

40 Claims, 5 Drawing Sheets

Typical filters (gray = pass-band, white = stop band)

US 8,849,053 B2

PARAMETRIC LOOP FILTER

CROSS-REFERENCE TO RELATED APPLICATION(S)

This application claims priority under 35 U.S.C. §119(e) of the U.S. Provisional Patent Application Ser. No. 61/433,026, filed Jan. 14, 2011 and titled, PARAMETRIC LOOP FILTER." The Provisional Patent Application Ser. No. 61/433,026, filed Jan. 14, 2011 and titled, "PARAMETRIC LOOP FILTER" is also hereby incorporated by reference in its entirety for all purposes.

FIELD OF THE INVENTION

The present invention relates to the field of image processing. More specifically, the present invention relates to using a parametric loop filter in image processing.

BACKGROUND OF THE INVENTION

In image processing, an adaptive loop filter (ALF) is performed to remove or reduce quantization noise and artifacts introduced during compression through wiener filtering as shown in FIG. 1. On/off signaling is able to be performed using a block-based adaptive loop filter (BALF) or a quad-tree based adaptive loop filter (QALF).

In quad-tree based on/off signaling, for each block (except those in the lowest layer), 1 bit is sent to specify if it is partitioned or not (partitioning signaling). For each non partitioned block (blocks in the lowest layer are always not partitioned), 1 additional bit is sent to specify if the ALF is applied to the block (on/off switch signaling). Given the Wiener filter, the quad-tree structure is optimized using bottom up recursive decision as shown in FIG. 2.

A Wiener filter is trained online based on the statistics of the pixels that have the ALF on. Training is done by the encoder. In some embodiments, each frame has a Wiener filter, of which the filter coefficients are sent to the decoder. Training of Wiener filters needs to know the on/off information of the pixels. However, the on-off decision also requires knowledge of the Wiener filter.

The iteration decision includes training an initial Wiener filter (e.g. based on all pixels), deciding which position to place an on/off switch based on the current Wiener filter, updating the Wiener filter based on all "on" pixels, and performing deciding and updating multiple times (e.g. until conversion).

There are many drawbacks of ALF. In the encoder, there is high computation complexity since there are multiple passes of optimization in filter training and on/off switching. The encoder requires additional delay of one frame (without ALF, the delay is in the order of lines). The encoder stores/retrieves the cross- and auto-correlation matrices for each leaf node multiple times meaning significant memory accesses. The bitstream includes overhead bits signaling the filter coefficients. In the decoder, the Wiener filter coefficients are variable, and multiplication between two variables is expensive compared to multiplying a variable by a fixed number which is able to be replaced with several bit-shifts and additions. Additionally, the hardware implementation of these ALF techniques is very costly, particularly for real-time encoding, because training of Wiener filters has to be done after the entire frame is encoded, and the results of ALF are needed for motion estimation of the next frame. Therefore, the entire pipeline is prolonged, which requires a higher clock rate and more power consumption to meet the real-time constraint.

SUMMARY OF THE INVENTION

A parametric loop filter uses a set of fixed filters to remove or reduce noise and artifacts introduced during video coding. The parametric loop filter utilizes much less computation, delay and memory access at the encoder. Fixed coefficients allow fast implementation of filtering at the decoder. To specify a 2-D ideal low-pass filter, the following information is used: direction, bandwidth along the direction ($bw_{//}$) and bandwidth perpendicular to the direction ($bw_{\perp}$).

In one aspect, a parametric loop filter for filtering quantization noise introduced during compression comprises a set of fixed filters and a selecting mechanism for selecting one of the fixed filters to filter a block. Each filter of the set of fixed filters is indexed by one or more parameters. The one or more parameters identify the filter to an encoder and a decoder. The one or more parameters are predictive coded and sent to a decoder. The one or more parameters comprise a direction, a first bandwidth along the direction and a second bandwidth perpendicular to the direction. The direction is derived using an edge detection scheme or predicted from neighboring blocks. The first bandwidth and the second bandwidth are predicted using neighboring blocks or derived based on local characteristics of the block. A filter of the set of fixed filters is selected by an encoder and a uniquely identifiable parameter associated with the filter is transmitted to a decoder. The filter receives filter coefficients, wherein the filter coefficients are determined using known filters obtained by offline training. Each filter of the set of fixed filters is a near ideal or ideal low-pass filter. The parametric loop filter is implemented in hardware. The parametric loop filter is stored in a memory and processed by a processor. The filter is combined with online training to further improve performance, wherein an encoder and a decoder are aware of a default set of filters, and the encoder has the option to decide if a certain filter should be updated to the online trained filter: for every predefined filter for a certain direction and bandwidth, if the filter is updated, the encoder sends a 1 to the decoder, followed by the coefficients of the new filter, otherwise a 0 is sent, and wherein the decision of updating or not is made per frame or every few frames. The filter is implemented by a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In another aspect, a method of filtering a quantization noise introduced during compression using a parametric loop filter comprises determining which filter to use from a set of fixed filters and using a selected filter to filter data. Each filter of the set of fixed filters is indexed by one or more parameters. The one or more parameters identify the filter to an encoder and a decoder. The one or more parameters are predictive coded and sent to a decoder. The one or more parameters comprise a direction, a first bandwidth along the direction and a second bandwidth perpendicular to the direction. The direction is derived using an edge detection scheme or predicted from neighboring blocks. The first bandwidth and the second bandwidth are predicted using neighboring blocks or derived based on local characteristics of a block. The selected filter is selected by an encoder and a uniquely identifiable parameter associated with the filter is transmitted to a decoder. The filter receives filter coefficients, wherein the filter coefficients are determined using known filters obtained by offline training. Each filter of the set of fixed filters is a near ideal or ideal low-pass filter. The parametric loop filter is implemented in hardware. The parametric loop filter is stored in a memory and processed by a processor. The filter is combined with online training to further improve performance, wherein an encoder and a decoder are aware of a default set of filters, and the encoder has the option to decide if a certain filter should be updated to the online trained filter: for every predefined filter for a certain direction and bandwidth, if the filter is updated, the encoder sends a 1 to the decoder, followed by the coefficients of the new filter, otherwise a 0 is sent, and wherein the decision of updating or not is made per frame or every few frames. The filter is implemented by a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In yet another aspect, an apparatus for filtering a quantization noise introduced during compression comprises a direction module for determining a direction, a parallel bandwidth module to determine a first bandwidth along the direction, a perpendicular bandwidth module to determine a second bandwidth perpendicular to the direction, a selection module for selecting a filter from a set of fixed filters based on the direction, the first bandwidth and the second bandwidth and a filtering module for using the selected filter to filter noise in a block. Each filter of the set of fixed filters is indexed by the direction, the first bandwidth and the second bandwidth. The direction is derived using an edge detection scheme or predicted from neighboring blocks. The first bandwidth and the second bandwidth are predicted using neighboring blocks or derived based on local characteristics of a block. A uniquely identifiable parameter associated with the selected filter is transmitted to a decoder. The filter receives filter coefficients, wherein the filter coefficients are determined using known filters obtained by offline training. Each filter of the set of fixed filters is a near ideal or ideal low-pass filter. The apparatus is combined with online training to further improve performance, wherein an encoder and a decoder are aware of a default set of filters, and the encoder has the option to decide if a certain filter should be updated to the online trained filter: for every predefined filter for a certain direction and bandwidth, if the filter is updated, the encoder sends a 1 to the decoder, followed by the coefficients of the new filter, otherwise a 0 is sent, and wherein the decision of updating or not is made per frame or every few frames. The apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

In yet another aspect, an apparatus comprises a memory for storing an application, the application for determining which filter to use from a set of fixed filters indexed by a set of parameters including a direction, a first bandwidth along the direction and a second bandwidth perpendicular to the direction and using a selected filter to filter data and a processing component coupled to the memory, the processing component configured for processing the application. The set of parameters identify the filter to an encoder and a decoder. The set of parameters are predictive coded and sent to a decoder. The direction is derived using an edge detection scheme or predicted using neighboring blocks. The first bandwidth and the second bandwidth are predicted using neighboring blocks or derived based on local characteristics of a block. A uniquely identifiable parameter associated with the selected filter is transmitted to a decoder. Each filter of the set of fixed filters is a near ideal or ideal low-pass filter. The apparatus is combined with online training to further improve performance, wherein an encoder and a decoder are aware of a default set of filters, and the encoder has the option to decide if a certain filter should be updated to the online trained filter: for every predefined filter for a certain direction and bandwidth, if the filter is updated, the encoder sends a 1 to the decoder, followed by the coefficients of the new filter, otherwise a 0 is sent, and wherein the decision of updating or not is made per frame or every few frames.

DETAILED DESCRIPTION OF THE PREFERRED EMBODIMENT

When encoding a video, a picture is divided into several macroblocks (or coding units, coding tree units). After encoding the macroblocks, the encoder selects an encoding mode according to a desired bit rate and distortion and performs encoding in the selected encoding mode.

A parametric loop filter (also referred to as a parametric adaptive loop filter) uses a set of fixed filters which utilize much less computation, delay and memory access at the encoder. Fixed coefficients allow fast implementation of filtering at the decoder. Each filter is indexed by several parameters (e.g. given a set of parameters, $p_1, p_2, \ldots, p_n$, the filter is able to be uniquely identified by both encoder and decoder). The parameters that specify the filter of a block are predictive coded and sent to the decoder. The encoder determines the best filter in the set of filters for each block of an image. The selection of the best filter at the encoder is able to be performed in a single pass processing for each large coding unit or block. In some embodiments, only the parameter (also referred to as an index) of the filter is transmitted to the decoder. In some embodiments, the parameter is uniquely identifiable.

Figure 1:
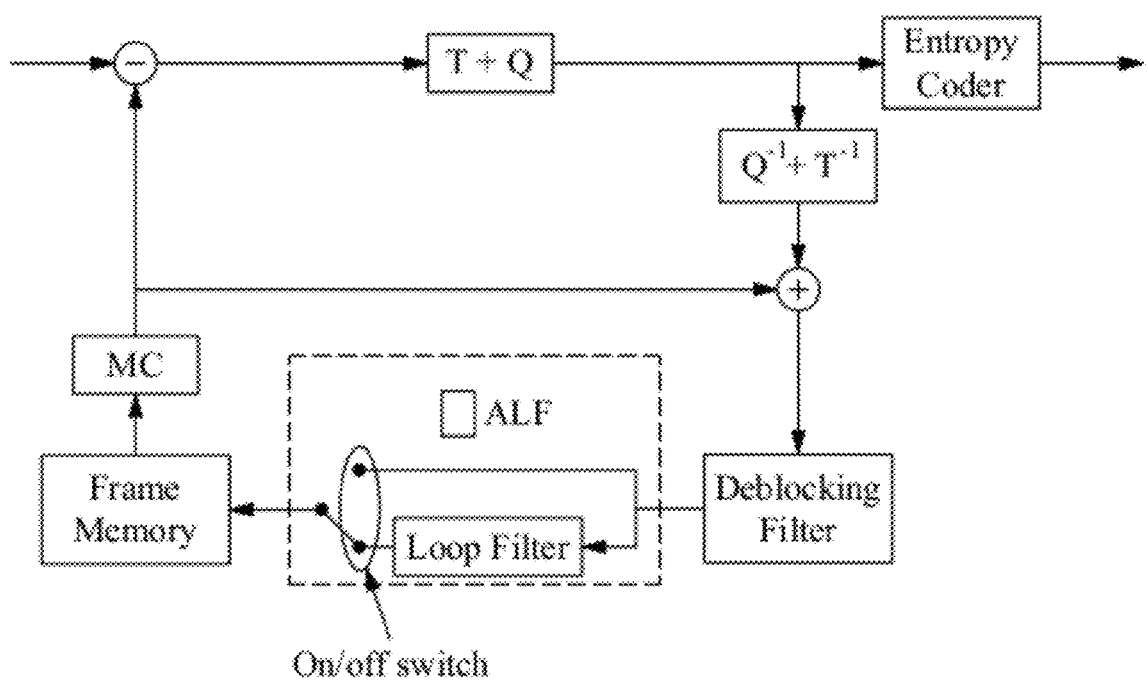
FIG. 1 illustrates a diagram of a portion of an encoder including an adaptive loop filter.
Figure 2:
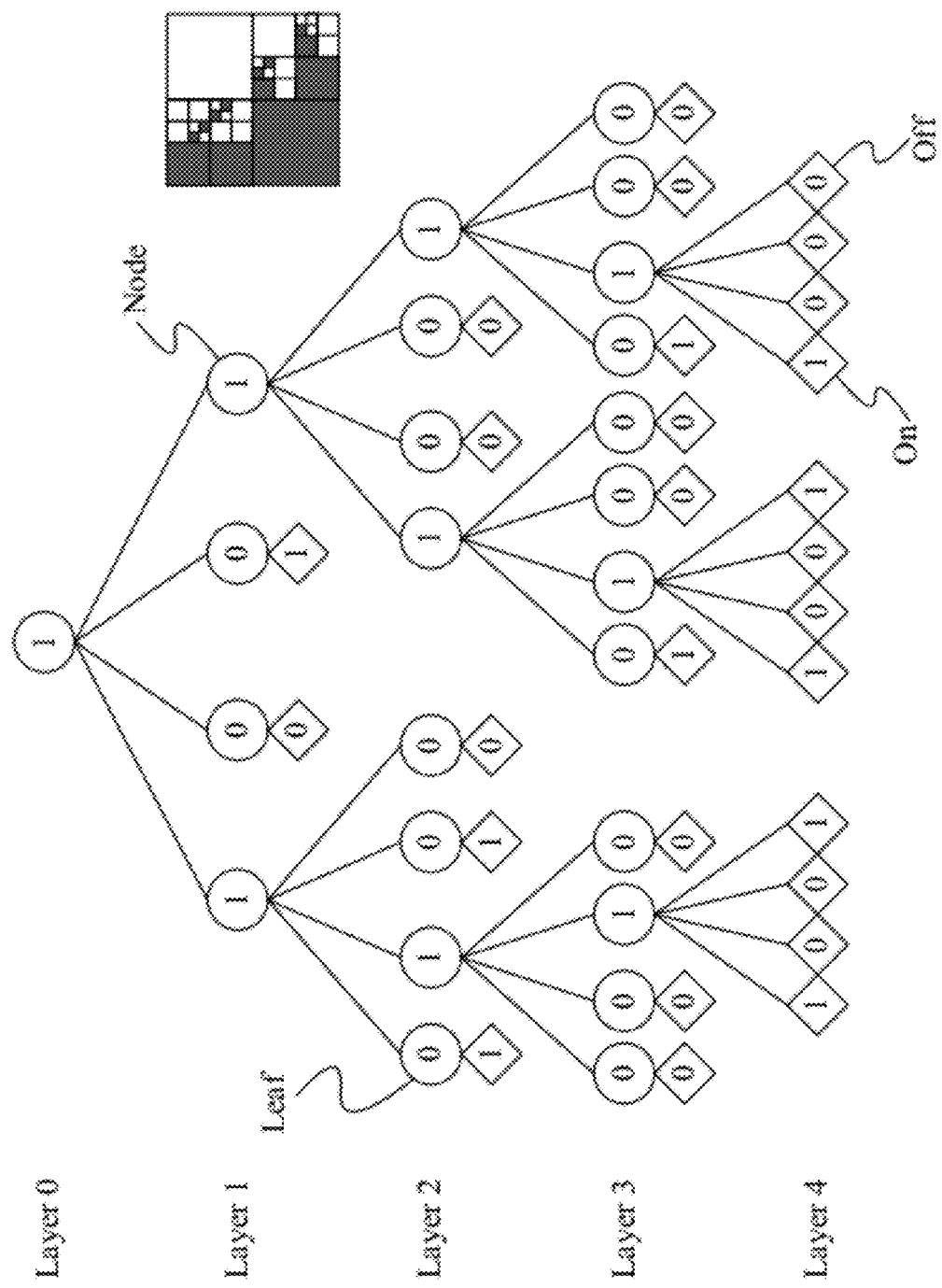
FIG. 2 illustrates a diagram of a bottom up recursive decision tree.
Figure 3:
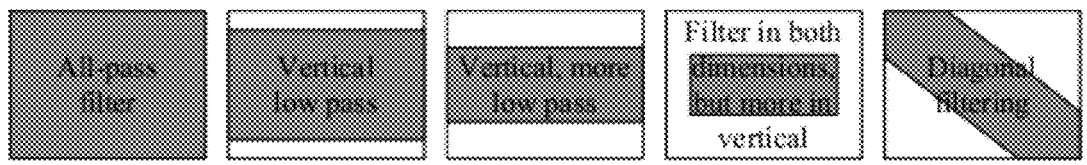
FIG. 3 illustrates examples of fixed filters according to some embodiments.

Using low-pass filters as candidate filters, if the compression is modeled as introducing additive noise to the original image, then ideal low-pass filters are a good approximation of Wiener filters. To specify a 2-D ideal low-pass filter, the following information is used: direction, bandwidth along the direction ($bw_{//}$) and bandwidth perpendicular to the direction ($bw_\perp$). Examples of typical filters are illustrated in FIG. 3. The filter coefficients are able to be obtained using known filters, off-line training or other methods. Known filters include, but are not limited to, Gaussian filters, Lanczos filters and others.

For blocks where the direction information is already available (e.g. intra-coded blocks that have a prediction direction), that direction is used as the prediction. For blocks where the direction information is not available, the direction is able to be derived using edge detection based schemes, since the decoder has access to the decoded current block. Alternatively, the direction information is able to be sent using Pulse Code Modulation (PCM), or based on a prediction from neighboring blocks. Bandwidths are able to be predicted using neighboring blocks or based on local characteristics of the block (e.g. the gradient strengths along or across the specified direction). The difference between the true parameter and its prediction is binarized using truncated unary code and coded using Context-Adaptive Binary Arithmetic Coding (CABAC).

Figure 4:
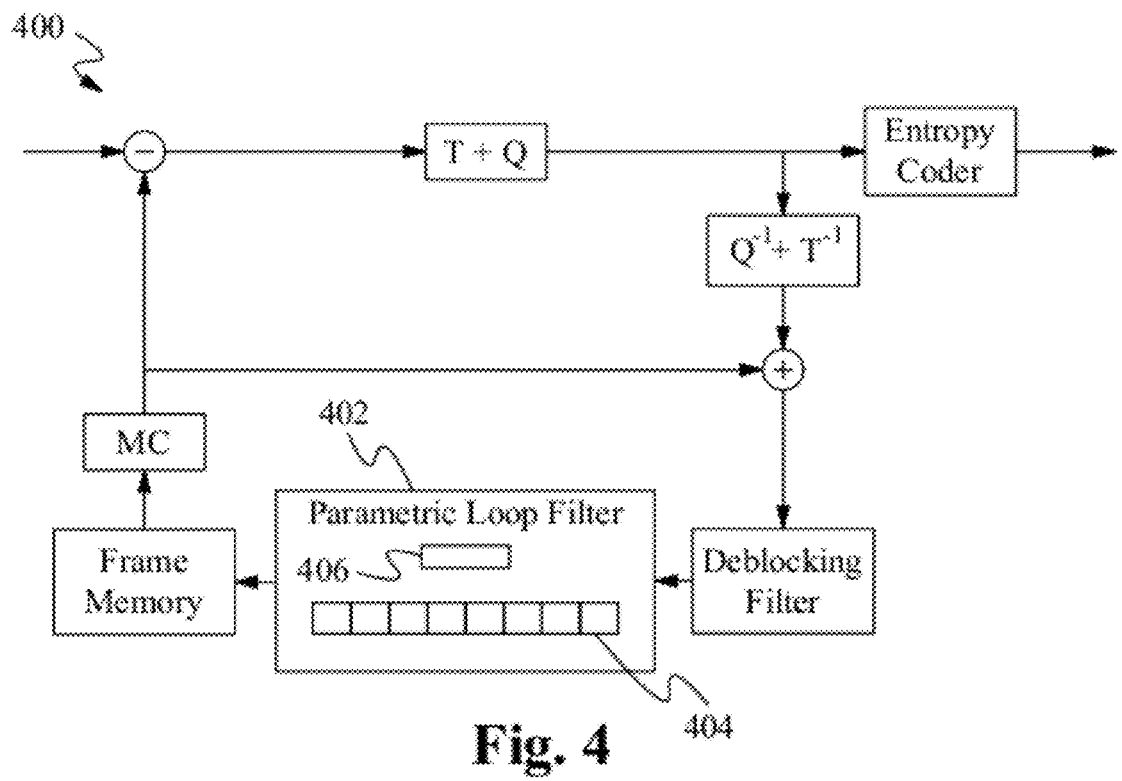
FIG. 4 illustrates a diagram of a portion of an encoder including a parametric loop filter according to some embodiments.

FIG. 4 illustrates a diagram of a parametric loop filter 402 contained within an encoder 400 according to some embodiments. The parametric loop filter 402 uses a set of fixed filters 404 to perform the computations. A selector 406 selects the appropriate filter to process a piece of information based on the specified criteria. Each filter is indexed by several parameters. Using low-pass filters as candidate filters, if the compression is modeled as introducing additive noise to the original image, then near ideal or ideal low-pass filters are a good approximation of Wiener filters. To specify a 2-D ideal low-pass filter, the following information is used: direction, bandwidth along the direction ($bw_{//}$) and bandwidth perpendicular to the direction ($bw_\perp$). The filter coefficients are able to be obtained using known filters, off-line training or other methods. Known filters include, but are not limited to, Gaussian filters, Lanczos filters and others.

For blocks where the direction information is already available (e.g. intra-coded blocks that have a prediction direction), that direction is used as the prediction. For blocks where the direction information is not available, the direction is able to be derived using edge detection based schemes, since the decoder has access to the decoded current block. Alternatively, the direction information is able to be sent using PCM, or based on a prediction from neighboring blocks. Bandwidths are able to be predicted using neighboring blocks or based on local characteristics of the block (e.g. the gradient strengths along or across the specified direction). The difference between the true parameter and its prediction is binarized using truncated unary code and coded CABAC.

Figure 5:
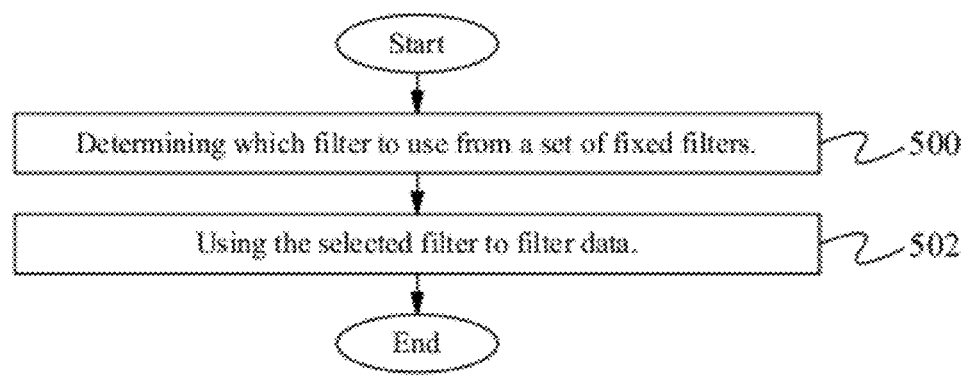
FIG. 5 illustrates a flowchart of a method of implementing parametric loop filtering according to some embodiments.

FIG. 5 illustrates a flowchart of a method of implementing parametric loop filtering according to some embodiments. In the step 500, which filter from a set of fixed filters to use for a block of data is determined. The filter is selected based on direction, bandwidth along the direction ($bw_{//}$) and bandwidth perpendicular to the direction ($bw_\perp$). In the step 502, the selected filter is used to filter the block. Fewer or additional steps are able to be included.

Figure 6:
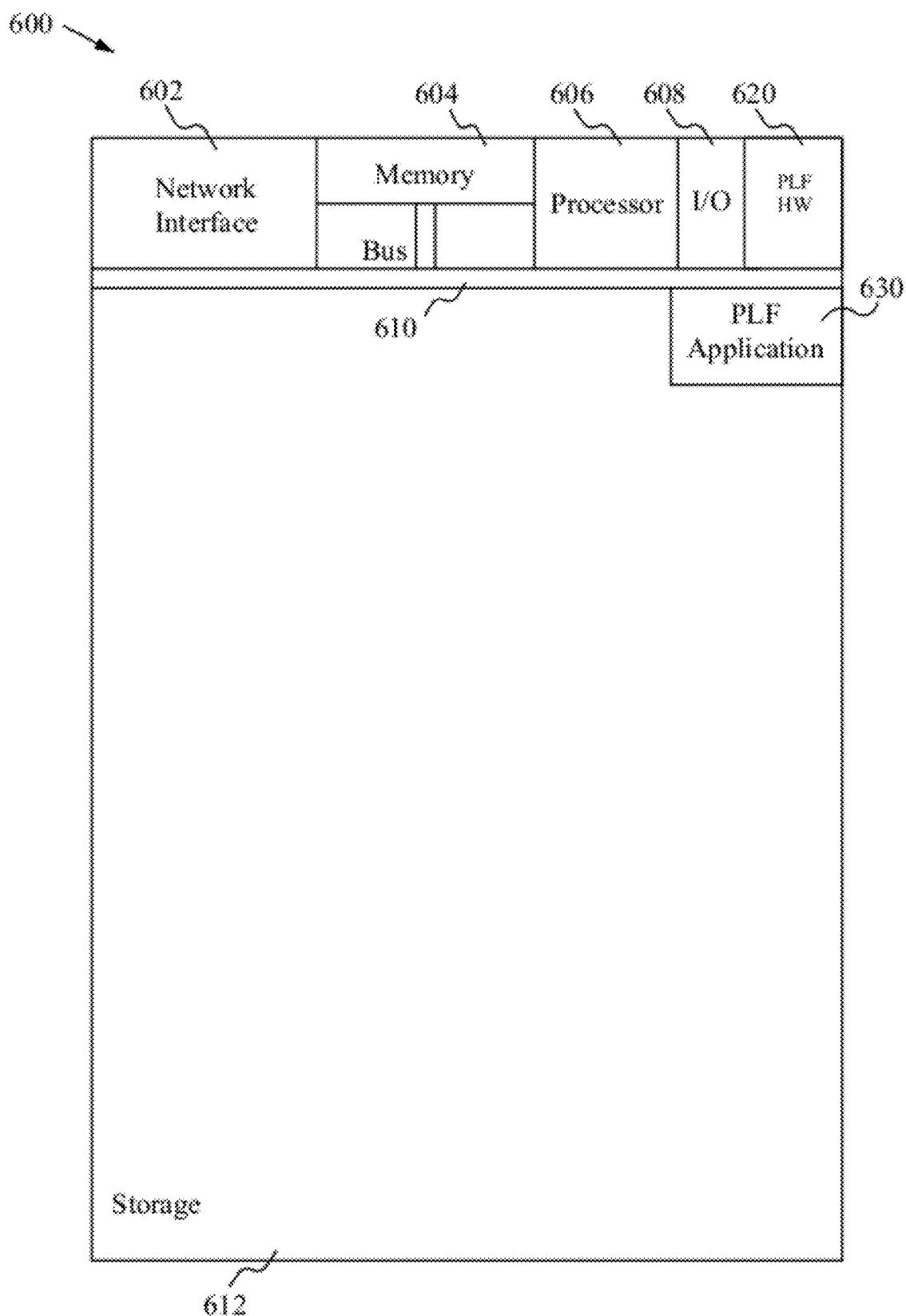
FIG. 6 illustrates a block diagram of an exemplary computing device configured to implement a parametric loop filter according to some embodiments.

FIG. 6 illustrates a block diagram of an exemplary computing device 600 configured to implement the parametric loop filter according to some embodiments. The computing device 600 is able to be used to acquire, store, compute, process, communicate and/or display information such as images, videos and audio. For example, a computing device 600 is able to acquire and store an image. The parametric loop filter is able to be used during or after acquiring the image, or when displaying the image on the device 600. In general, a hardware structure suitable for implementing the computing device 600 includes a network interface 602, a memory 604, a processor 606, I/O device(s) 608, a bus 610 and a storage device 612. The choice of processor is not critical as long as a suitable processor with sufficient speed is chosen. The memory 604 is able to be any conventional computer memory known in the art. The storage device 612 is able to include a hard drive, CDROM, CDRW, DVD, DVDRW, flash memory card or any other storage device. The computing device 600 is able to include one or more network interfaces 602. An example of a network interface includes a network card connected to an Ethernet or other type of LAN. The I/O device(s) 608 are able to include one or more of the following: keyboard, mouse, monitor, display, printer, modem, touchscreen, button interface and other devices. In some embodiments, the hardware structure includes multiple processors and other hardware to perform parallel processing. Parametric loop filter application(s) 630 used to perform the filtering are likely to be stored in the storage device 612 and memory 604 and processed as applications are typically processed. More or less components shown in FIG. 6 are able to be included in the computing device 600. In some embodiments, parametric loop filter hardware 620 is included. Although the computing device 600 in FIG. 6 includes applications 630 and hardware 620 for implementing the parametric loop filter, the filtering method is able to be implemented on a computing device in hardware, firmware, software or any combination thereof. For example, in some embodiments, the parametric loop filter applications 630 are programmed in a memory and executed using a processor. In another example, in some embodiments, the parametric loop filter hardware 620 is programmed hardware logic including gates specifically designed to implement the method.

In some embodiments, the parametric loop filter application(s) 630 include several applications and/or modules. Modules include a selection module to select a filter from a set of fixed filters to use for a block of data and a filtering module for using the selected filter to filter the block. In some embodiments additional modules include a direction module for determining a direction, a parallel bandwidth module to determine a bandwidth along the direction ($bw_{//}$) and a perpendicular bandwidth module to determine a bandwidth perpendicular to the direction ($bw_\perp$). In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television, a home entertainment system or any other suitable computing device.

In some embodiments, parametric adaptive loop filters (PALF) are able to be used for high efficiency video coding. For luma, M×N fixed filters are pre-trained offline with the combination of M directions and N bandwidths plus one additional all pass filter (of which the impulse response is a delta function). Each largest coding unit (LCU) decides on a maxDepth used for signaling of the PALF parameters. This maxDepth is signaled at each LCU of the decoder. PALF parameters signaled at each CU (depth<=maxDepth) includes a direction (e.g. 1 . . . M) and filter strength (bandwidth) along the direction (e.g. 0 . . . N) where filter strength of 0 means no filtering (in which case the direction is not sent). The filter strength (bandwidth) perpendicular to the direction is assumed to be 0 (all-pass). The parameters of direction and strength are able to be predicted from neighboring CUs and coded using variable length codes. PALF parameters are decided once for each LCU, then the LCU is filtered according to the parameters and no further access is needed of that LCU. In some embodiments, where the filters are trained as 9×9 in size, this yields a maximum encoder delay of 1 LCU+4 lines.

In some embodiments, 8 directions and 4 bandwidths are used. The 8 directions are VERTICAL, HORIZONTAL, DIAG_DOWN_LEFT, DIAG_DOWN_RIGHT, VER_RIGHT, HOR_DOWN, VER_LEFT and HOR_UP (same as the directions in AVC intra prediction), and are indexed using 1~8 respectively. In coding of the filter bandwidth, if the filter strength level n ($0 \leq n \leq 4$) of the current CU is equal to the predicted strength level which is obtained from the left and top CUs, then only a 1 is transmitted. Otherwise, a 0 is transmitted and the actual level n is signaled utilizing a fixed length code. Except for the case of the all-pass filter, signaling of the direction of the filter follows next. The prediction of the strength level is equal to the minimum strength level between left and top CUs. The method of coding direction is similar, but if the predicted direction is different from the true direction, a variable length code of 2 bits or 3 bits needs to be sent in addition to identify from the rest 7.

The encoder optimization includes finding the best max depth $D_{max}$ for each LCU and the best filter indices (m, n) for all CUs within the LCU. This is accomplished by finding the Sum of Squared Error (SSE) between the original block and the filtered version of the reconstructed block. The SSE associated with all possible filters is computed in the case of an exhaustive search method. However, many fast search algorithms are able to be used to avoid an exhaustive search. Starting from the first CU, the filter with the minimum Rate-Distortion (RD) cost is selected for each CU. To further reduce the computational cost of the encoder, the signaling cost of each filter is approximated when an arithmetic entropy coding engine is used.

For chroma, in some embodiments, chroma filters are 5×5 for YUV420 sequences. Signaling of the filter parameters for the chroma channels is similar to that of luma, except that the maximum depth $D_{max}$ is typically of a smaller value. Both chroma components use the same filter strength and direction which minimizes the sum of their RD costs. For the filter direction of the chroma components, a flag is sent to signal whether the direction is the same as luma or not. If the direction is different, then, it is signaled similarly to the luma directions. Otherwise, no extra bits will be necessary, and the directions of corresponding luma blocks are used for chroma components.

In some applications, the encoder is not sensitive to delay and memory access. In such applications, PALF is able to be combined with online training to further improve performance. Both the encoder and the decoder are aware of the default set of filters (e.g. offline trained). The encoder has the option to decide if a certain filter should be updated to the online trained filter. For every predefined filter (for a certain direction and bandwidth, if a filter is updated, the encoder sends a "1" to the decoder, followed by the coefficients of the new filter, otherwise a "0" is sent. The decision of updating or not is able to be made per frame or every few frames.

To utilize a parametric loop filter, a user acquires a video/image such as on a digital camcorder, and while or after the video is acquired, or when displaying the video, the parametric loop filter is automatically used for filtering the image, so that noise in the image is removed. The parametric loop filter is able to be implemented automatically without user involvement.

In operation, the parametric loop filter is able to filter noise from data in a much more efficient manner than a Wiener filter, particularly at low bit-rate applications, where there is not enough bit budget to signal Wiener filter coefficients. The parametric loop filter utilizes fewer computations, less delay and less memory access at the encoder. The delay is less because the encoder only processes each block once, and after the last block, there are no additional access to current frame. Since there is less memory access required, there are low memory and memory bus requirements. The fixed filters are hardware friendly and fast. Fewer computations also results in low power usage.

In contrast, the traditional ALF has high complexity with many operations needed to find filter coefficients. Variable filter coefficients are costly, and many pass processing at the encoder increases delay and requires high bus bandwidth which is not hardware friendly.

Some Embodiments of Parametric Loop Filter

1. A parametric loop filter for filtering quantization noise introduced during compression comprising:
   a. a set of fixed filters; and
   b. a selecting mechanism for selecting one of the fixed filters to filter a block.
2. The filter of clause 1 wherein each filter of the set of fixed filters is indexed by one or more parameters.
3. The filter of clause 2 wherein the one or more parameters identify the filter to an encoder and a decoder.
4. The filter of clause 2 wherein the one or more parameters are predictive coded and sent to a decoder.
5. The filter of clause 2 wherein the one or more parameters comprise a direction, a first bandwidth along the direction and a second bandwidth perpendicular to the direction.
6. The filter of clause 5 wherein the direction is derived using an edge detection scheme or predicted from neighboring blocks.
7. The filter of clause 5 wherein the first bandwidth and the second bandwidth are predicted using neighboring blocks or derived based on local characteristics of the block.
8. The filter of clause 1 wherein a filter of the set of fixed filters is selected by an encoder and a uniquely identifiable parameter associated with the filter is transmitted to a decoder.
9. The filter of clause 1 wherein the filter receives filter coefficients, wherein the filter coefficients are determined using known filters obtained by offline training
10. The filter of clause 1 wherein each filter of the set of fixed filters is a near ideal or ideal low-pass filter.
11. The filter of clause 1 wherein the parametric loop filter is implemented in hardware.
12. The filter of clause 1 wherein the parametric loop filter is stored in a memory and processed by a processor.
13. The filter of clause 1 wherein the filter is combined with online training to further improve performance, wherein an encoder and a decoder are aware of a default set of filters, and the encoder has the option to decide if a certain filter should be updated to the online trained filter: for every predefined filter for a certain direction and bandwidth, if the filter is updated, the encoder sends a 1 to the decoder, followed by the coefficients of the new filter, otherwise a 0 is sent, and wherein the decision of updating or not is made per frame or every few frames.
14. The filter of clause 1 wherein the filter is implemented by a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

15. A method of filtering a quantization noise introduced during compression using a parametric loop filter comprising:
   a. determining which filter to use from a set of fixed filters; and
   b. using a selected filter to filter data.

16. The method of clause 15 wherein each filter of the set of fixed filters is indexed by one or more parameters.

17. The method of clause 16 wherein the one or more parameters identify the filter to an encoder and a decoder.

18. The method of clause 16 wherein the one or more parameters are predictive coded and sent to a decoder.

19. The method of clause 16 wherein the one or more parameters comprise a direction, a first bandwidth along the direction and a second bandwidth perpendicular to the direction.

20. The method of clause 19 wherein the direction is derived using an edge detection scheme or predicted from neighboring blocks.

21. The method of clause 19 wherein the first bandwidth and the second bandwidth are predicted using neighboring blocks or derived based on local characteristics of a block.

22. The method of clause 15 wherein the selected filter is selected by an encoder and a uniquely identifiable parameter associated with the filter is transmitted to a decoder.

23. The method of clause 15 wherein the filter receives filter coefficients, wherein the filter coefficients are determined using known filters obtained by offline training 24. The method of clause 15 wherein each filter of the set of fixed filters is a near ideal or ideal low-pass filter.

25. The method of clause 15 wherein the parametric loop filter is implemented in hardware.

26. The method of clause 15 wherein the parametric loop filter is stored in a memory and processed by a processor.

27. The method of clause 15 wherein the filter is combined with online training to further improve performance, wherein an encoder and a decoder are aware of a default set of filters, and the encoder has the option to decide if a certain filter should be updated to the online trained filter: for every predefined filter for a certain direction and bandwidth, if the filter is updated, the encoder sends a 1 to the decoder, followed by the coefficients of the new filter, otherwise a 0 is sent, and wherein the decision of updating or not is made per frame or every few frames.

28. The method of clause 15 wherein the filter is implemented by a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

29. An apparatus for filtering a quantization noise introduced during compression comprising:
   a. a direction module for determining a direction;
   b. a parallel bandwidth module to determine a first bandwidth along the direction;
   c. a perpendicular bandwidth module to determine a second bandwidth perpendicular to the direction;
   d. a selection module for selecting a filter from a set of fixed filters based on the direction, the first bandwidth and the second bandwidth; and
   e. a filtering module for using the selected filter to filter noise in a block.

30. The apparatus of clause 29 wherein each filter of the set of fixed filters is indexed by the direction, the first bandwidth and the second bandwidth.

31. The apparatus of clause 29 wherein the direction is derived using an edge detection scheme or predicted from neighboring blocks.

32. The apparatus of clause 29 wherein the first bandwidth and the second bandwidth are predicted using neighboring blocks or derived based on local characteristics of a block.

33. The apparatus of clause 29 wherein a uniquely identifiable parameter associated with the selected filter is transmitted to a decoder.

34. The apparatus of clause 29 wherein the filter receives filter coefficients, wherein the filter coefficients are determined using known filters obtained by offline training 35. The apparatus of clause 29 wherein each filter of the set of fixed filters is a near ideal or ideal low-pass filter.

36. The apparatus of clause 29 wherein the apparatus is combined with online training to further improve performance, wherein an encoder and a decoder are aware of a default set of filters, and the encoder has the option to decide if a certain filter should be updated to the online trained filter: for every predefined filter for a certain direction and bandwidth, if the filter is updated, the encoder sends a 1 to the decoder, followed by the coefficients of the new filter, otherwise a 0 is sent, and wherein the decision of updating or not is made per frame or every few frames.

37. The apparatus of clause 29 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

38. An apparatus comprising:
   a. a memory for storing an application, the application for:
      i. determining which filter to use from a set of fixed filters indexed by a set of parameters including a direction, a first bandwidth along the direction and a second bandwidth perpendicular to the direction; and
      ii. using a selected filter to filter data; and
   b. a processing component coupled to the memory, the processing component configured for processing the application.

39. The apparatus of clause 38 wherein the set of parameters identify the filter to an encoder and a decoder.

40. The apparatus of clause 38 wherein the set of parameters are predictive coded and sent to a decoder.

41. The apparatus of clause 38 wherein the direction is derived using an edge detection scheme or predicted using neighboring blocks.

42. The apparatus of clause 38 wherein the first bandwidth and the second bandwidth are predicted using neighboring blocks or derived based on local characteristics of a block.

43. The apparatus of clause 38 wherein a uniquely identifiable parameter associated with the selected filter is transmitted to a decoder.

44. The apparatus of clause 38 wherein each filter of the set of fixed filters is a near ideal or ideal low-pass filter.

45. The apparatus of clause 38 wherein the apparatus is combined with online training to further improve performance, wherein an encoder and a decoder are aware of a default set of filters, and the encoder has the option to decide if a certain filter should be updated to the online trained filter: for every predefined filter for a certain direction and bandwidth, if the filter is updated, the encoder sends a 1 to the decoder, followed by the coefficients of the new filter, otherwise a 0 is sent, and wherein the decision of updating or not is made per frame or every few frames.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A parametric loop filter for filtering quantization noise introduced during compression comprising:
   a. a set of fixed filters; and
   b. a selecting mechanism for selecting one of the fixed filters to filter a block, wherein each filter of the set of fixed filters is indexed by one or more parameters, wherein the one or more parameters comprise a direction, a first bandwidth along the direction and a second bandwidth perpendicular to the direction.

2. The filter of claim 1 wherein the one or more parameters identify the filter to an encoder and a decoder.

3. The filter of claim 1 wherein the one or more parameters are predictive coded and sent to a decoder.

4. The filter of claim 1 wherein the direction is derived using an edge detection scheme or predicted from neighboring blocks.

5. The filter of claim 1 wherein the first bandwidth and the second bandwidth are predicted using neighboring blocks or derived based on local characteristics of the block.

6. The filter of claim 1 wherein a filter of the set of fixed filters is selected by an encoder and a uniquely identifiable parameter associated with the filter is transmitted to a decoder.

7. The filter of claim 1 wherein the filter receives filter coefficients, wherein the filter coefficients are determined using known filters obtained by offline training.

8. The filter of claim 1 wherein each filter of the set of fixed filters is a near ideal or ideal low-pass filter.

9. The filter of claim 1 wherein the parametric loop filter is implemented in hardware.

10. The filter of claim 1 wherein the parametric loop filter is stored in a memory and processed by a processor.

11. The filter of claim 1 wherein the filter is implemented by a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

12. A parametric loop filter for filtering quantization noise introduced during compression comprising:
   a. a set of fixed filters; and
   b. a selecting mechanism for selecting one of the fixed filters to filter a block, wherein each filter of the set of fixed filters is indexed by one or more parameters wherein the filter is combined with online training to further improve performance, wherein an encoder and a decoder are aware of a default set of filters, and the encoder has the option to decide if a certain filter should be updated to the online trained filter: for every predefined filter for a certain direction and bandwidth, if the filter is updated, the encoder sends a 1 to the decoder, followed by the coefficients of the new filter, otherwise a 0 is sent, and wherein the decision of updating or not is made per frame or every few frames.

13. A method of filtering a quantization noise introduced during compression using a parametric loop filter, the method programmed in a non-transitory memory of a device, comprising:
   a. determining which filter to use from a set of fixed filters; and
   b. using a selected filter to filter data, wherein each filter of the set of fixed filters is indexed by one or more parameters, wherein the one or more parameters comprise a direction, a first bandwidth along the direction and a second bandwidth perpendicular to the direction.

14. The method of claim 13 wherein the one or more parameters identify the filter to an encoder and a decoder.

15. The method of claim 13 wherein the one or more parameters are predictive coded and sent to a decoder.

16. The method of claim 13 wherein the direction is derived using an edge detection scheme or predicted from neighboring blocks.

17. The method of claim 13 wherein the first bandwidth and the second bandwidth are predicted using neighboring blocks or derived based on local characteristics of a block.

18. The method of claim 13 wherein the selected filter is selected by an encoder and a uniquely identifiable parameter associated with the filter is transmitted to a decoder.

19. The method of claim 13 wherein the filter receives filter coefficients, wherein the filter coefficients are determined using known filters obtained by offline training.

20. The method of claim 13 wherein each filter of the set of fixed filters is a near ideal or ideal low-pass filter.

21. The method of claim 13 wherein the parametric loop filter is implemented in hardware.

22. The method of claim 13 wherein the parametric loop filter is stored in a memory and processed by a processor.

23. A method of filtering a quantization noise introduced during compression using a parametric loop filter, the method programmed in a non-transitory memory of a device, comprising:
   a. determining which filter to use from a set of fixed filters; and
   b. using a selected filter to filter data, wherein each filter of the set of fixed filters is indexed by one or more parameters, wherein the filter is combined with online training to further improve performance, wherein an encoder and a decoder are aware of a default set of filters, and the encoder has the option to decide if a certain filter should be updated to the online trained filter: for every predefined filter for a certain direction and bandwidth, if the filter is updated, the encoder sends a 1 to the decoder, followed by the coefficients of the new filter, otherwise a 0 is sent, and wherein the decision of updating or not is made per frame or every few frames.

24. The method of claim 13 wherein the filter is implemented by a device selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

25. An apparatus for filtering a quantization noise introduced during compression comprising:
 a. a direction module for determining a direction;
 b. a parallel bandwidth module to determine a first bandwidth along the direction;
 c. a perpendicular bandwidth module to determine a second bandwidth perpendicular to the direction;
 d. a selection module for selecting a filter from a set of fixed filters based on the direction, the first bandwidth and the second bandwidth; and
 e. a filtering module for using the selected filter to filter noise in a block, wherein each filter of the set of fixed filters is indexed by the direction, the first bandwidth and the second bandwidth.

26. The apparatus of claim 25 wherein the direction is derived using an edge detection scheme or predicted from neighboring blocks.

27. The apparatus of claim 25 wherein the first bandwidth and the second bandwidth are predicted using neighboring blocks or derived based on local characteristics of a block.

28. The apparatus of claim 25 wherein a uniquely identifiable parameter associated with the selected filter is transmitted to a decoder.

29. The apparatus of claim 25 wherein the filter receives filter coefficients, wherein the filter coefficients are determined using known filters obtained by offline training.

30. The apparatus of claim 25 wherein each filter of the set of fixed filters is a near ideal or ideal low-pass filter.

31. The apparatus of claim 25 wherein the apparatus is combined with online training to further improve performance, wherein an encoder and a decoder are aware of a default set of filters, and the encoder has the option to decide if a certain filter should be updated to the online trained filter: for every predefined filter for a certain direction and bandwidth, if the filter is updated, the encoder sends a 1 to the decoder, followed by the coefficients of the new filter, otherwise a 0 is sent, and wherein the decision of updating or not is made per frame or every few frames.

32. The apparatus of claim 25 wherein the apparatus is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®/iPhone/iPad, a video player, a DVD writer/player, a Blu-ray® writer/player, a television and a home entertainment system.

33. An apparatus comprising:
 a. a memory for storing an application, the application for:
  i. determining which filter to use from a set of fixed filters indexed by a set of parameters including a direction, a first bandwidth along the direction and a second bandwidth perpendicular to the direction; and
  ii. using a selected filter to filter data; and
 b. a processing component coupled to the memory, the processing component configured for processing the application.

34. The apparatus of claim 33 wherein the set of parameters identify the filter to an encoder and a decoder.

35. The apparatus of claim 33 wherein the set of parameters are predictive coded and sent to a decoder.

36. The apparatus of claim 33 wherein the direction is derived using an edge detection scheme or predicted using neighboring blocks.

37. The apparatus of claim 33 wherein the first bandwidth and the second bandwidth are predicted using neighboring blocks or derived based on local characteristics of a block.

38. The apparatus of claim 33 wherein a uniquely identifiable parameter associated with the selected filter is transmitted to a decoder.

39. The apparatus of claim 33 wherein each filter of the set of fixed filters is a near ideal or ideal low-pass filter.

40. The apparatus of claim 33 wherein the apparatus is combined with online training to further improve performance, wherein an encoder and a decoder are aware of a default set of filters, and the encoder has the option to decide if a certain filter should be updated to the online trained filter: for every predefined filter for a certain direction and bandwidth, if the filter is updated, the encoder sends a 1 to the decoder, followed by the coefficients of the new filter, otherwise a 0 is sent, and wherein the decision of updating or not is made per frame or every few frames.

* * * * *